Aug. 17, 1965  A. BUSKE  3,201,183
SHAFT AND SLIDING BEARING ASSEMBLY
Filed Dec. 13, 1962  2 Sheets-Sheet 1

Inventor:
ALFRED BUSKE
by Burger, Dinklage & Sprung
ATTORNEYS

Aug. 17, 1965        A. BUSKE        3,201,183
SHAFT AND SLIDING BEARING ASSEMBLY
Filed Dec. 13, 1962        2 Sheets-Sheet 2

Inventor:
ALFRED BUSKE
By Burgess, Dinklage & Sprung
ATTORNEYS

3,201,183
SHAFT AND SLIDING BEARING ASSEMBLY
Alfred Buske, Neckarsulm, Wurttemberg, Germany, assignor to Karl Schmidt G.m.b.H., Neckarsulm, Wurttemberg, Germany, a German corporation
Filed Dec. 13, 1962, Ser. No. 246,292
Claims priority, application Germany, Dec. 16, 1961,
Sch 30,721
13 Claims. (Cl. 308—78)

The present invention relates to shaft bearings and has for its object to provide an improved shaft-bearing assembly which is better able to meet the exacting requirements of present day technology.

Slide or journal bearings are commonly provided with a circular bore of diameter sufficiently greater than the diameter of the shaft to be received in the bearing, to permit the presence of a lubricating film between the shaft and the bearing. In operation, upon variation of the load on the shaft, vibration in the audible range occurs and objectionable noises result. To obviate this operating characteristic, it has been proposed to provide the slide bearing oval in cross-section. In such bearings, the shaft is in bearing engagement with the bearing at but two points. These points are diametrically opposed. Clearances at the bearing engagement points are positive and are intended to insure the presence of a lubricating film between the shaft and bearing at the loci of bearing engagement, i.e. at the diametrically opposed points referred to above. It is known that bearings of this type permit the use of smaller clearances than can be used with the more common bearings wherein the slide bearing has a circular bore.

While oval bearings better accommodate varying loads in that objectionable noises are reduced, they do not provide a complete solution to the problem as even with the oval bearings, load variation may set up vibrations resulting in objectionable noises.

It is a principal object of the invention to provide a bearing assembly less susceptible to the generation of noise upon varying load than are the known bearings.

According to the invention, this and other objects are realized by providing a bearing assembly employing the principle of oval type bearings and characterized in that the clearance is not greater than zero clearance. It is surprising that zero clearance or a negative fit can be utilized.

The invention provides an assembly including a shaft and a sliding bearing therefor, the slide bearing being in bearing engagement with the shaft, and said bearing engagement is at spaced intervals about the shaft diameter. The assembly is characterized in that the clearance of the shaft and bearing is not greater than zero. The loci of bearing engagement can be two or more in number, and, in a preferred embodiment, there are two loci of bearing engagement, said two loci being diametrically opposed. In another preferred embodiment of the invention, there are three loci of bearing engagement and these three loci can be spaced at 120° intervals.

The invention is further described with reference to the accompanying drawings, wherein.

Figure 1:
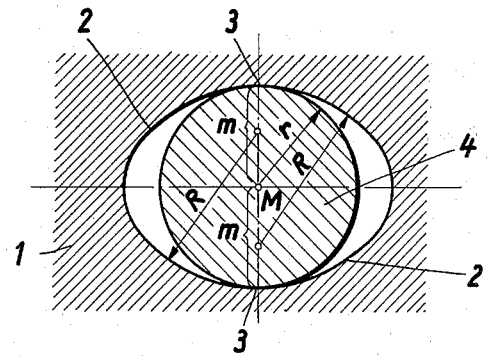
FIG. 1 is a cross-sectional view of an embodiment according to the invention wherein the slide bearing is of elliptical form, in cross-section.

Referring to FIG. 1, in the assembly shown there, the bearing 1 is provided with an elliptically shaped bore 2, and a circular shaft 4 is received in the bore 2. The dimension $m$ indicated on the drawing is the distance from the center of the elliptical bore of the bearing 1 to the bearing surface 2, and is the minor diameter of the ellipse of the bore 22. The dimension $r$ is the radius of the shaft 4. According to the invention, the radius $r$ is equal to or greater than the dimension $m$ of the slide bearing. Thus, with the shaft 4 received in the bore 2 of the bearing 1, the shaft is in bearing engagement with the bore of the bearing at two diametrically opposed points 3 and the fit of the shaft with a bearing at these points is zero clearance or less than zero clearance, so that a pressed fit is provided. Thus, upon assembly of the shaft and bearing, where less than zero clearance is utilized, the shaft and bearing are pre-stressed. Such a pre-stressed fit results in an elastic deformation of the bearing at the points or loci of bearing engagement. In operation, a lubricating film is present at the loci of bearing engagement and between the shaft and the bearing surface of the bearing. The lubricating film pressures during operation are extraordinarily high and these high pressures serve to assure stable hydrodynamic support of the shaft. The film pressure which the lubricant will withstand is higher than the nominal load for which the bearing assembly is to be used.

In bearing assemblies according to the invention utilizing a particular shaft, it is desirable that the bearing surface of the bearing, at the loci of bearing engagement, be arcuate, and preferably the arc of the bearing surface of the bearing at such loci is a circular arc. In utilization of a clearance-free arrangement according to the invention, it has been found that improved operation results if the difference in radius R for the arc of the bearing surface of the bearing and the radius $r$ of the shaft, is larger than as has been the practice with respect to known oval bearing assemblies wherein clearance is utilized. Referring to the drawings, it will be appreciated that R is the distance from a point on a center line of the shaft to a locus of bearing engagement of the shaft and bearing. To facilitate the representation in the drawings, the R's are shown as being between such points on the center lines and points on the bearing surfaces spaced from the loci of bearing engagement.

More particularly, the radius of the engaging surface of the bearing bore, that is R preferably is related to the radius $r$ of the shaft in substantial accordance with the formula:

$$6 \times 10^{-3} > \frac{R-r}{r} > 0.8 \times 10^{-3}$$

In this formula, R has the meaning assigned to it above, and likewise $r$ has the meaning assigned above. Tests have shown that higher shaft loads can be withstood, without objectionable noise, for higher values of the ratio $R-r/r$, i.e. as the value for this ratio approaches $6 \times 10^{-3}$, higher shaft loads can be withstood without objectionable noise.

In the embodiment shown in FIG. 1, the elliptical bore in the bearing 1 can be formed so that the bearing engagement points 3 of the bore bearing surface 2 are on circular arcs of radius R, and the radius R bears to the radius $r$ a relationship as is defined in the above formula.

The assemblies according to the invention are to be distinguished from known prior art bearing assemblies wherein bearing elements are in resilient engagement with a shaft. Such a prior art bearing is disclosed, for example, in German Patent 926,644, April 21, 1955. In the bearing assemblies of the instant invention, the bearing sections in engagement with the shaft are rigidly secured together. Such construction is provided in the embodiment of FIG. 1 by forming the bearing 1 of a single piece of metal, so that the bearing sections are integrally joined together.

Figure 2:
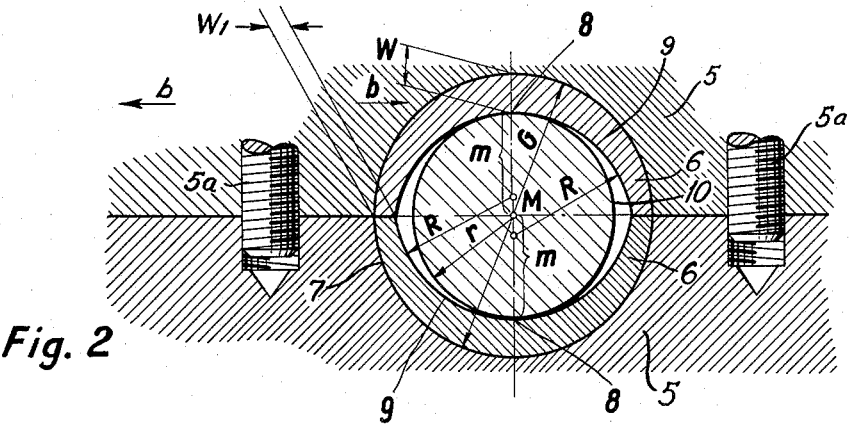
FIG. 2 is a cross-sectional view of a modified embodiment of the invention and wherein the slide bearing includes elements having internal bearing surface defined by a circular arc.

In the embodiment shown in FIG. 2, the assembly includes a bearing housing 5 formed in two halves, each having a recess adapted for receiving the bearing halves 6 of the bearing. The bearing halves 6 are received in the housing recesses in close-fitting relation. The outer surface of the bearing halves are semi-circles, so that the halves in place as is shown in the drawing, form a circle. The close fit of the bearing halves 6 in the recesses can be utilized to retain the bearing fixed in the housing or any suitable means can be utilized, such as set screw, for retaining the bearing in fixed position.

Still referring to FIG. 2, the inside surface of each bearing half 6 is formed by a circular segment of radius R and the shaft is of radius r. The surface of bearing halves 6, while being circular arcs, are less than semi-circles and hence, the bearing bore is of the oval type. The reference letter M indicates the center of the bearing bore along a line joining the diametrically opposed bearing engagement loci 8 of the surface of the bore, and the distance m from the center M to the bearing engagement loci 8, as was the case for the construction shown in FIG. 1 is equal to or smaller than the radius r of the shaft 10.

The construction wherein the assembly includes a housing for the bearing is a preferred form of the invention, and for this construction, the invention provides tolerances which, it has been found, occasion improved results in operation of the bearings. Thus, the tolerances for the housing, bearing, and shaft are preferably related in accordance with the formula:

$$G \text{ min.} - 2W \text{ max.} - Z \text{ max.} \leqq 0$$

wherein:

G min. is the minimum permissible dimension of the housing recess perpendicular to the axis of the recess and along a line passing through the bearing engagement loci;

W max. is the maximum permissible wall thickness of the bearing at loci of engagement of the shaft and bearing; and Z max. is the maximum permissible diameter of the shaft.

Utilizing tolerances in accordance with this formula, even for the most unfavorable dimension, in accordance with tolerances, of the housing, bearing, and shaft, even pressures between the shaft and the engaging loci of the bearing bore are obtained.

Referring to FIG. 2 to provide tolerances in accordance with the foregoing formula, the tolerance for the outer diameter G of the bearing, the tolerance for the wall thickness W of the bearing at the loci of bearing engagement, and the tolerance for the diameter Z of the shaft, bear the relationship set forth in the formula.

If desired, in order to provide for variation of the clearance between the shaft and the bearing bore, means can be provided for shifting the housing halves 5, and therefore the bearing halves 6, in relation to each other as is indicated by the arrows b.

Figure 3:
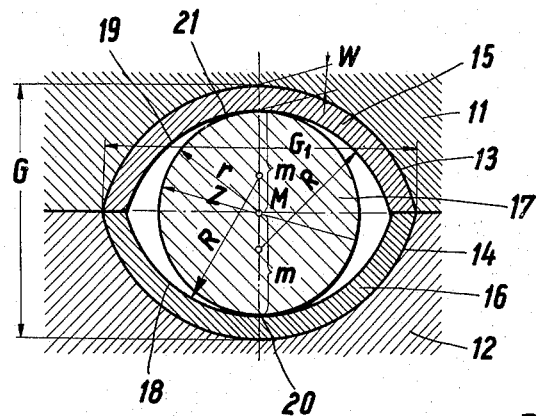
FIG. 3 is a cross-sectional view of a construction different from the construction shown in FIG. 2 in respect to the wall thickness of the slide bearing.
Figure 4:
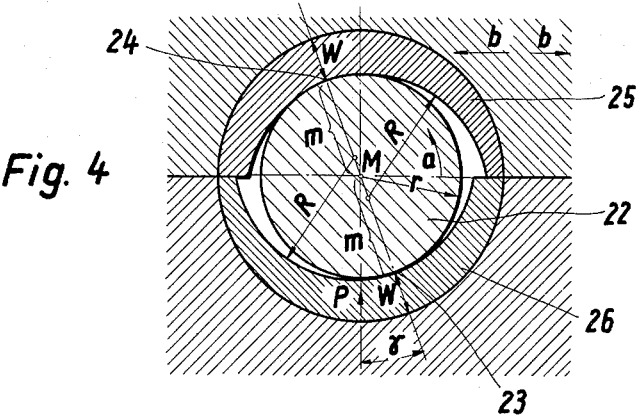
FIG. 4 is a cross-sectional view of a bearing assembly according to the invention characterized in that the bearing engagement loci are offset from the load line of the shaft.
Figure 5:
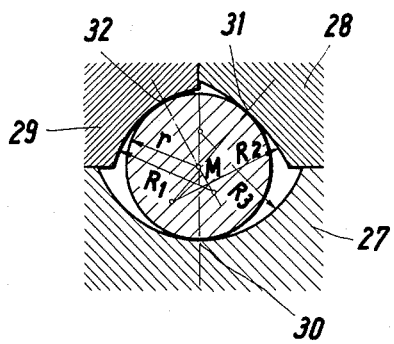
FIG. 5 is a cross-sectional view of a bearing assembly according to the invention characterized in that three bearing engagement loci are utilized.

In the embodiment shown in FIG. 2, rigid connection of the bearing sections in engagement with the shaft is provided by securing of the housing halves 5 together with bolts 5a. In the embodiments of FIGS. 3–5, shortly to be described, like means can be used to rigidly secure bearing sections together.

With respect to the embodiment shown in FIG. 3, this embodiment differs from the embodiment shown in FIG. 2 in that the inner surface 18 and the outer surface 14 of the bearing half 16, and the corresponding surfaces of the bearing half 15, are each segments of a circular arc. In this construction, that wall thickness W of the bearing halves is constant, and in this respect, the construction shown in FIG. 3 differs from the construction shown in FIG. 2, since in FIG. 2 the wall thickness of the bearing halves reduces from thickness W at the point of bearing engagement to thickness $W_1$ along the larger diameter of the recess in the housing 5.

In the FIG. 3 embodiment, the housing is formed of halves 11 and 12, and each housing half is provided with a recess in the form of a segment of a circle. The recess, however, is less than a semi-circle. Thus, the housing bore provided upon matching the housing halves is oval in form and has a large diameter $G_1$ and a small diameter G, the small diameter passes through the bearing engaging loci 20. The shaft 17 is received in the bearing bore 21 with a clearance in accordance with the invention, and the tolerances for G, W, and Z, are in accordance with the formula set forth above to tolerances.

The embodiment shown in FIG. 4 corresponds, in general, with the embodiment shown in FIG. 2, except that the bearing halves 25 and 26 are recessed with respect to one another along the joining line of the bearing halves. By this construction assembly can be provided so that a line through the spaced diametrically opposed bearing engagement loci 23 and 24 is offset from a line in the direction of the center of load on the shaft 22. The offset is by an angle of about 8–60 or 8–40 degrees in the direction of rotation of the shaft, as is indicated by the letter a. The direction of the bearing load through the center M is indicated by the letter P. The greatest wall thickness W of the bearing halves 25 and 26 is at the loci of bearing engagement. A bearing characterized in that the line through diametrically opposed bearing engagement loci is offset, as is indicated in FIG. 4, from the direction of the center of load on the shaft, is the subject of my co-pending application Serial No. 245,595, filed December 18, 1962. As is indicated here a bearing so constructed can advantageously be provided with clearance and tolerance in accordance with the instant invention. The offset angle is preferably 10–30°.

As was mentioned with respect to FIG. 3, the bearing assembly shown in FIG. 4 can be provided with means for adjusting the housing halves, and therefore the bearing halves in the direction of the arrows b in order to vary the clearance between the shaft 22 and the bearing.

A bearing according to the invention can be provided with more than two loci of engagement of the shaft and bearing. A bearing assembly according to the assembly wherein three loci of bearing engagement are provided, is represented in FIG. 5. Here, the bearing is formed of bearing half 27, bearing quarter 28, and bearing quarter 29 and the bearings are shaped to provide a bore such that bearing engagement occurs at the loci 30, 31, and 32. These loci can be at 120° angles with respect to each other. In this embodiment, the bearing engagement loci on the surfaces of the bearing engagement parts 27, 28 and 29, are circular arcs of, respectively, radii $R_3$, $R_2$, and $R_1$, which radii extend through the center of the shaft.

In a modification of the invention, instead of providing a bearing with an oval bore, the bearing can be provided with a circular bore and the shaft can be oval in form. Such a modification finds application where the bearings must transmit unbalanced forces and in bearings for radial type engines and W motors and V motors.

The invention offers particular advantages with respect to the prior art where the use of bearings and bearing housings of light metal in combination with ferrous metal or steel shafts are concerned. The light metals have relatively high coefficients of expansion, whereas the ferrous metals have relatively low coefficients of expansion, and thus, in the prior art, where positive clearances are provided, upon the various parts attaining high temperature, the light metal bearing and bearing housing expand more than the ferrous shaft, and, hence, the clearances become excessive so that noise levels, upon variation in load, become very objectionable. According to the invention, the clearance at ambient temperature for the parts can be made zero or less than zero (negative clearance or pressed fit), so that upon the attaining of higher temperatures of the various parts, the clearances are not enlarged to as great an extent as is the case for prior assemblies. Further, according to the invention, the clearance at normal temperature can be a pressed fit or pre-stressed clearance so that at operating temperature the clearance is zero or less than zero, and thus, clearance can be avoided even at the high temperatures normal to running condition.

There is also to be considered, the utilization of a bearing assembly according to the invention where low temperatures are encountered at operating conditions. Thus, in the prior art, where the bearing assemblies were provided for low temperature operation, the clearances for operation at normal or ambient temperatures were made excessive, all with the view of providing a positive clearance at the lower operating temperature. Following the teaching of the invention which contemplates the operation of the bearing assembly at the operating conditions with zero or less than zero clearance, the bearing assembly can be provided so that at normal or ambient temperature, the clearance is zero, or possibly somewhat greater than zero, so that a positive clearance exists, or, if desired, less than zero, and the design is such that at the low operating temperature the clearance is zero or less than zero.

From the foregoing considerations with respect to operation at high and low temperatures, it will be appreciated that a bearing assembly according to the invention is particularly well suited to those assemblies which include on the one hand parts of high thermal expansion, and, on the other hand, parts of low thermal expansion. Thus, the bearing assembly according to the invention is particularly well suited to application where the bearing housing and/or the bearing is of light metal, such as aluminum or aluminum alloy, and the shaft is of a ferrous metal such as steel or the like.

The above set forth formula for clearance with respect to the bearing housing, the bearing, and the shaft, can be applied for various conditions of operation. Whereas it can be applied for the condition of operation corresponding to ambient temperature for the operating parts, it can, as desirably is, applied for the running condition, that is for the temperature applying under operating conditions, be this a high temperature or a low temperature relative to the ambient temperature.

Whereas it is not desired to predicate the instant invention on any particular theory of operation, yet it can be mentioned that operation according to the invention with zero or less than zero clearance may be due to the development of very high pressures in oil films existing between the shaft and bearing at the loci of bearing engagement of the parts. The area of bearing engagement, according to the invention, is very narrow and pressures of great magnitude develop within the oil films at these places of engagement. The pressures can be as high as 1000 atmospheres or even more. Under such pressures, the bearings may be elastically expanded and at the same time the excessively high pressures of the oil film may serve to impart a stable mounting of the shaft within the bearing, so that, on the one hand, low friction is encountered, while, on the other hand, the bearing assembly does not give rise to objectionable noise during normal operation and upon variation in bulk.

While the invention has been described with reference to particular embodiments thereof, various alterations and modifications will occur to those skilled in the art, and it is desired to secure by these Letters Patent all such changes as are within the scope of the appended claims.

What is claimed is:

1. An assembly comprising a shaft and a sliding bearing therefor and in slide bearing engagement therewith, the bearing being in bearing engagement with the shaft at spaced loci about the shaft circumference, the bearing including a circumferentially extending bearing section for each locus of bearing engagement with the shaft, the bearing sections being rigidly secured together, said assembly being characterized in that the clearance of the shaft and bearing is less than zero the radii R of loci of bearing engagement of the bearing and the radii r of the loci of bearing engagement of the shaft being related in substantial accordance with the formula:

$$6 \times 10^{-3} > \frac{R-r}{r} > 0.8 \times 10^{-3}$$

whereby the assembly of the shaft and bearing is prestressed resulting in elastic deformation of the bearing at loci of bearing engagement.

2. An assembly comprising a shaft and a sliding bearing therefor and in slide bearing engagement therewith, the bearing being in bearing engagement with the shaft at spaced loci about the shaft circumference the bearing including a circumferentially extending bearing section for each locus of bearing engagement with the shaft, the bearing sections being rigidly secured together, the loci of bearing engagement of the shaft and of the bearing being circular arcs, said assembly being characterized in that the clearance of the shaft and bearing is less than zero and in that radii R of loci of bearing engagement of the bearing and the radii r of the loci of bearing engagement of the shaft are related in substantial accordance with the formula:

$$6 \times 10^{-3} > \frac{R-r}{r} > 0.8 \times 10^{-3}$$

whereby the assembly of the shaft and bearing is prestressed resulting in elastic deformation of the bearing at loci of bearing engagement.

3. An assembly according to claim 1, and comprising a housing for the bearing, said housing having a recess, said bearing being received in close fitting relation in the recess for support of the bearing by the housing, the tolerances for the housing, bearing, and shaft being related in accordance with the following formula:

$$G \text{ min.} - 2W \text{ max.} - Z \text{ max.} \geqq 0$$

wherein:

G min. is the minimum permissible dimension of the housing recess perpendicular to the axis of the recess and along a line passing through the bearing engagement loci;

W max. is the maximum permissible wall thickness of the bearing at loci of engagement of the shaft and bearing; and Z max. is the maximum permissible diameter of the shaft.

4. An assembly according to claim 2, and comprising a housing for the bearing, said housing having a recess, said bearing being received in close fitting relation in the recess for support of the bearing by the housing, the tolerances for the housing, bearing, and shaft being related in accordance with the following formula:

$$G \text{ min.} - 2W \text{ max.} - Z \text{ max.} \geqq 0$$

wherein:

G min. is the minimum permissible dimension of the housing recess perpendicular to the axis of the recess and along a line passing through the bearing engagement loci;

W max. is the maximum permissible wall thickness of the bearing at loci of engagement of the shaft and bearing; and Z max. is the maximum permissible diameter of the shaft.

5. An assembly comprising a shaft and a sliding bearing therefor and in slide bearing engagement therewith, the bearing being in bearing engagement with the shaft only at spaced diametrically opposed loci, the bearing including a circumferentially extending bearing section for each locus of bearing engagement with the shaft, the bearing sections being rigidly secured together, said assembly being characterized in that the clearance of the shaft and bearings is less than zero the radii R of loci of bearing engagement of the bearing and the radii r of the loci of bearing engagement of the shaft being related in substantial accordance with the formula:

$$6 \times 10^{-3} > \frac{R-r}{r} > 0.8 \times 10^{-3}$$

whereby the assembly of the shaft and bearing is prestressed resulting in elastic deformation of the bearing at loci of bearing engagement.

6. An assembly comprising a shaft and a sliding bearing therefor and in slide bearing engagement therewith, the bearing being in bearing engagement with the shaft only at spaced diametrically opposed loci, the bearing including a circumferentially extending bearing section for each locus of bearing engagement with the shaft, the bearing sections being rigidly secured together, the loci bearing engagement of the shaft and of the bearing being circular arcs, said assembly being characterized in that the clearance of the shaft and bearing is less than zero and in that radii R of loci of bearing engagement of the bearing and the radii r of the loci of bearing engagement of the shaft are related in substantial accordance with the formula:

$$6 \times 10^{-3} > \frac{R-r}{r} > 0.8 \times 10^{-3}$$

whereby the assembly of the shaft and bearing is prestressed resulting in elastic deformation of the bearing at loci of bearing engagement.

7. An assembly according to claim 5, and comprising a housing for the bearing, said housing having a recess, said bearing being received in close fitting relation in the recess for support of the bearing by the housing, the tolerances for the housing, bearing, and shaft being related in accordance with the following formula:

$$G \text{ min.} - 2W \text{ max.} - Z \text{ max.} \geqq 0$$

wherein:

G min is the minimum permissible dimension of the housing recess perpendicular to the axis of the recess and along a line passing through the bearing engagement loci;

W max. is the maximum permissible wall thickness of the bearing at loci of engagement of the shaft and bearing; and Z max. is the maximum permissible diameter of the shaft.

8. An assembly according to claim 6, and comprising a housing for the bearing, said housing having a recess, said bearing being received in close fitting relation in the recess for support of the bearing for the housing, the tolerances for the housing, bearing, and shaft being related in accordance with the following formula:

$$G \text{ min.} - 2W \text{ max.} - Z \text{ max.} \geqq 0$$

wherein:

G min. is the minimum permissible dimension of the housing recess perpendicular to the axis of the recess and along a line passing through the bearing engagement loci;

W max. is the maximum permissible wall thickness of the bearing at loci of engagement of the shaft and bearing; and Z max. is the maximum permissible diameter of the shaft.

9. An assembly according to claim 5, a line through said spaced diametrically opposed loci being offset from a line in the direction of the center of load on the shaft by an angle of about 8–60° in the direction of rotation of the shaft.

10. A bearing assembly according to claim 1, the bearing being in bearing engagement with the shaft at at least three loci about the shaft.

11. A bearing assembly according to claim 2, the bearing being in bearing engagement with the shaft at at least three loci about the shaft.

12. A bearing assembly according to claim 1, the bearing being in bearing engagement with the shaft at three and only three loci about the shaft.

13. A bearing assembly according to claim 2, the bearing being in bearing engagement with the shaft at three and only three loci about the shaft.

References Cited by the Examiner

UNITED STATES PATENTS

| | | | |
|---|---|---|---|
| 2,901,297 | 8/59 | Sternlicht | 308—121 |
| 3,070,406 | 12/62 | McKenney | 308—122 |

FOREIGN PATENTS

| | | |
|---|---|---|
| 926,644 | 4/55 | Germany. |
| 820,052 | 12/55 | Great Britain. |

ROBERT C. RIORDON, *Primary Examiner.*

FRANK SUSKO, *Examiner.*